May 16, 1961 G. V. EDMONSON Re. 24,988

FLUID COUPLING

Original Filed Oct. 15, 1954

INVENTOR,
Glenn V. Edmonson
BY
Harness, Dickey & Pierce
ATTORNEYS.

United States Patent Office

Re. 24,988
Reissued May 16, 1961

24,988

FLUID COUPLING

Glenn V. Edmonson, Ann Arbor, Mich., assignor, by mesne assignments, to Liquid Drive Corporation, Holly, Mich., a corporation of Michigan Original No. 2,878,645, dated Mar. 24, 1959, Ser. No. 462,449, Oct. 15, 1954. Application for reissue Feb. 18, 1960, Ser. No. 9,661

3 Claims. (Cl. 60—54)

Matter enclosed in heavy brackets [ ] appears in the original patent but forms no part of this reissue specification; matter printed in italics indicates the additions made by reissue.

This invention relates to fluid couplings and, more particularly, to an improved fluid coupling particularly adapted for use in transmitting relatively high power at relatively high speeds.

Heretofore, when conventional fluid couplings have been employed to transmit relatively high power at relatively high speeds, failure of the rotating elements of the couplings has occurred. In an effort to overcome these failures, various attempts have been made to strengthen these elements by continued stiffening of the various elements, the stiffening being intended to reduce the stresses resulting from the high centrifugal pressures of the fluid within the fluid coupling and the high centrifugal stresses in the elements themselves. However, such efforts have not produced satisfactory results and the failures have continued.

An object of the present invention is to overcome disadvantages in prior fluid couplings and to provide an improved fluid coupling which is particularly adapted to transmit relatively high power at relatively high speeds.

Another object of the invention is to provide an improved fluid coupling incorporating improved means for separating torsional stresses in the fluid coupling from hydraulic stresses.

Another object of the invention is to provide an improved fluid coupling incorporating improved means for supporting the rotor vanes whereby reversed moments or stress concentrations in the shell elements defining the fluid circuit are eliminated.

Another object of the invention is to provide an improved fluid coupling that is economical to manufacture and assemble, durable, efficient and reliable in operation.

Another object of the invention is to provide an improved fluid coupling incorporating improved means for maintaining the axial dimensions of the fluid circuits substantially constant.

Another object of the invention is to provide an improved multiple circuit fluid coupling incorporating improved means for transmitting power to the primary rotors of the coupling.

Another object of the invention is to provide an improved fluid coupling incorporating improved means for circulating fluid through the unit for cooling purposes.

Still another object of the invention is to provide an improved fluid coupling incorporating improved means for controlling the speed and torque of the unit and for rapidly disengaging the unit.

Figure 1:
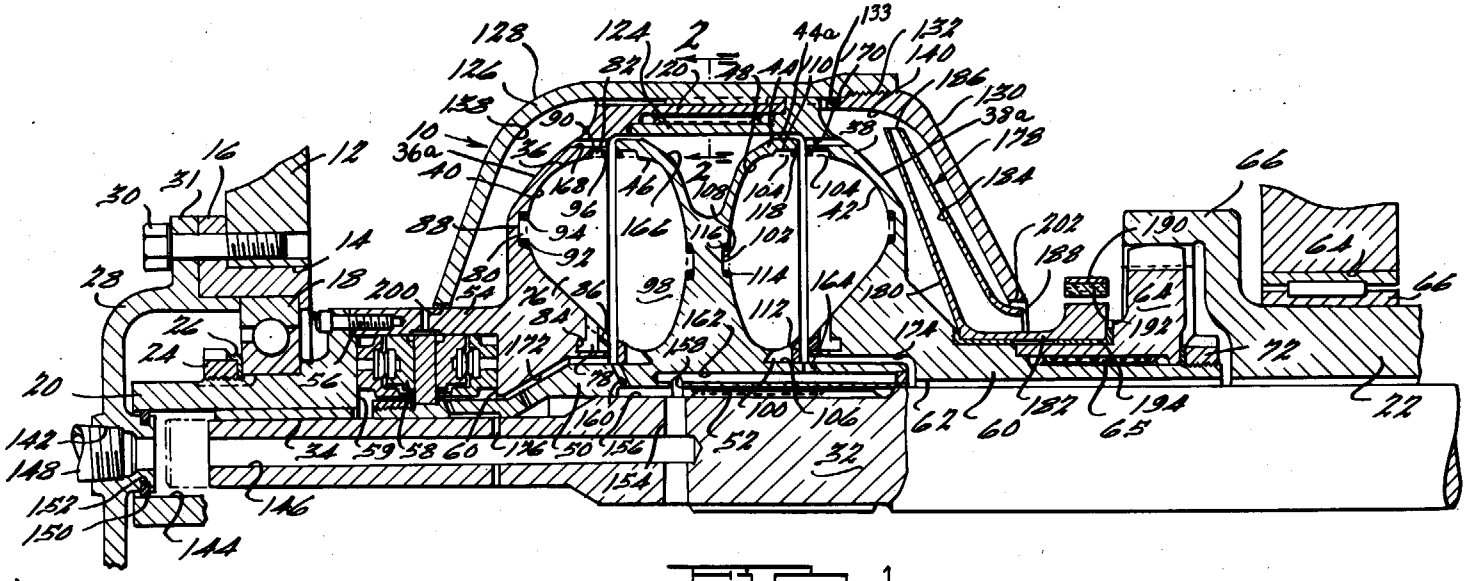
Figure 2:
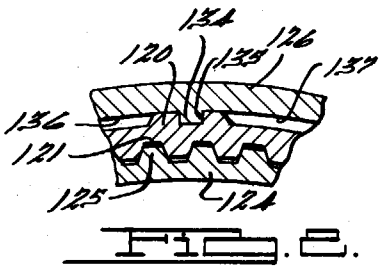

The above as well as other objects and advantages of the present invention will become apparent from the following description, the appended claims and the accompanying drawing wherein:

Figure 1 is a fragmentary, longitudinal, sectional view of a fluid coupling embodying the present invention; and Fig. 2 is a fragmentary, transverse, sectional view of the fluid coupling illustrated in Fig. 1, taken on the line 2—2 thereof.

Referring to the drawing, the present invention is shown incorporated in a twin-circuit fluid coupling, generally designated 10, particularly adapted for use in transmitting relatively high power at relatively high speeds, although it will be understood that the present invention is applicable to other uses. The fluid coupling 10 is comprised of a housing 12 having an opening 14 in one end thereof adapted to receive a retainer ring 16. The retainer ring 16 carries a bearing 18 which supports a shaft 20, the shaft 20 constituting an extension of the drive shaft 22 of the fluid coupling. The bearing 18 is retained by a nut 24 and washer 26, the nut 24 threadably engaging the axially outer end portion of the shaft 20. A closure member 28 is provided for the housing 12 and is secured to the housing 12 by a bolt 30 that extends through the retaining ring 16 and a flange 31 provided on the closure member, and threadably engages the housing 12. The shaft 20 is mounted for rotation on one end portion of the driven shaft 32 of the fluid coupling, a suitable bearing 34 being interposed between the shaft 20 and the driven shaft 32. With such a construction, the shaft 20 is free to rotate relative to the driven shaft 32 and is also free to rotate relative to the housing 12.

A pair of coaxially aligned primary rotors or impellers 36 and 38 are provided which including shell members 36a and 38a, respectively, that define generally hemi-toroidal chambers 40 and 42 that are disposed in spaced confronting relationship. A secondary rotor or runner 44 is provided which is disposed coaxially between the impellers 36 and 38 and which includes a shell member 44a that defines a pair of generally hemi-toroidal chambers 46 and 48 that spacedly confront the chambers 40 and 42, respectively, defined by the impeller shell members 36a and 38a whereby the chambers 40 and 46 and the chambers 48 and 42 define twin fluid circuits which serve to transmit power through the fluid coupling.

The runner shell member 44a includes a hub portion 50 that is splined, as at 52, to the driven shaft 32 so that axial movement of the driven shaft 32 relative to the runner 44 is permitted. The impeller shell member 36a includes a hub portion 54 which spacedly surrounds the hub portion 50 of the runner shell member 44a and which is secured to the shaft 20, as by bolts 56. In order that the axial dimensions of the fluid circuit may be maintained substantially constant so as to reduce surging within the fluid circuit, a thrust bearing 58 is provided between a radial face 59 provided on the shaft 20 and a radial face 60 provided on the hub portion 54 of the impeller shell member 36a. Since the runner 44 is splined to the driven shaft 32, axial movement of the driven shaft 32 relative to the rotors is permitted and, at the same time, the axial dimensions of the fluid circuit are maintained substantially constant.

The impeller shell member 38a includes a hub portion 60 which defines a bore 62 through which the driven shaft 32 extends. A gear 64 is splined on the axially outer end portion of the hub 60, as at 65, and the gear 64 meshes with a ring gear 66 fixed to the drive shaft 22 of the fluid coupling, the drive shaft 22 extending through an opening 64 in the housing 12 coaxially aligned with the opening 14, and a suitable bearing 66 being interposed between the housing and the drive shaft 22. The gear 64 is retained by a nut 72 which threadably engages the axially outer end of the hub portion 60 of the impeller 38.

The impellers 36 and 38 also include a plurality of radially extending vanes 76 which are mounted in each of the chambers 40 and 42 of the impellers 36 and 38, each of the vanes 76 having integral outwardly projecting tabs 78, 80 and 82. The tabs 78 of the vanes 76 are fitted in slots 84 provided in each of the impeller shell members at a position adjacent the hub portion of the impeller shell member, and the tabs 78 are retained by rings 86 so as to lock the vanes at the hub. The tabs 80 and 82 are mounted in slots 88 and 90 provided in the central portions and peripheral portions, respectively, of the shell members 36a and 38a, and are retained by locking rings 92, 94 and 96. The slots 84, 88 and 90 space the vanes tangentially and sufficient clearance is provided to permit distortion of the shell members with respect to the neighboring vane portions. With such a construction, alternate rigid and flexible sections in the impellers are eliminated, thereby eliminating the possibility of reverse moments or stress concentrations at the points where the vanes are joined to the peripheral portions of the impeller due to the high centrifugal forces and the high hydraulic pressures in the circuit when the fluid coupling is in operation.

A plurality of radially extending vanes 98 are mounted in each of the chambers 46 and 48 of the runner shell member 44a, each of the vanes 98 having integral tabs 100, 102 and 104. The tabs 100 are fitted in slots 106 provided adjacent the hub portion of the runner shell member 44a while the tabs 102 and 104 are fitted in slots 108 and 110, respectively, provided in the central portions and the peripheral portions of the runner shell member 44a. The tabs 100, 102 and 104 are retained by rings 112, 114, 116 and 118 and the slots in which the tabs are disposed space the vanes tangentially of the chambers 46 and 48 of the runner. Sufficient clearance is provided to permit distortion of the runner shell member with respect to the neighboring vane portions, and, with such a construction, alternate rigid and flexible sections in the runner 44 are eliminated, thereby eliminating the possibility of reversed moments or stress concentrations at the points where the vanes are joined to the runner.

The impeller shell member 36a is provided with a peripheral flange portion 120 which projects axially outwardly toward the impeller 38 and spacedly encompasses the runner shell member 44a. As shown in Fig. 2, the flange portion 120 of the impeller shell member 36a is provided with radially extending involute serrations 121 and the flange portion 120 is keyed to a peripheral flange portion 124 provided on the impeller shell member 38a, the flange portion 124 projecting axially toward the impeller 36 in spaced relationship with respect to the runner 44 and being provided with radially extending involute projections 125 which are received in the serrations 121. An outer shell 126 is also provided which surounds the impellers 36 and 38 and the runner 44, the outer shell including a main body portion 128 and a cover portion 130, threadably connected to the main body portion 128, as at 132. A suitable sealing ring 133 is also provided to insure a fluid-tight connection therebetween. As shown in Figs. 1 and 2, the outer shell 126 is provided with integral angularly spaced keys 134 and is keyed to the flange portion 120 of the impeller shell member 36a at angularly spaced points, keyways 135 being provided in the flange portion 120 to receive the keys 134. Fluid passageways, such as 136 and 137, are provided between the areas at which the outer shell 126 is keyed to the flange portion 120, so that a fluid path is provided which interconnects the chambers 138 and 140 defined between the outer shell member 126 and the impellers 36 and 38.

A pipe fitting socket opening 142 is provided in the closure member 28, the socket opening communicating through the bore 144 of the shaft 20 with a longitudinally extending passageway 146 provided in the driven shaft 32. A supply line 148 communicating with a source of fluid under pressure (not shown) is connected to the socket opening 142, and a suitable sealing ring 150 is interposed between the shaft 20 and a boss 152 provided on the closure member 20 to insure a fluid-tight connection. The inner end portion of the passageway 146 communicates with the twin fluid circuits defined by the chambers 40 and 46 and the chambers 48 and 42 through radially extending ports 154, an annular groove 156 provided in the runner 44, and ports 158, 160, 162 and 164, the ports 160 and 164 discharging into the fluid circuits through the spaces between the impellers 36 and 38 and the runner 44. The generally toroidal fluid circuits are also connected with each other through the annular space 166 between the peripheral flanges of the impellers and the peripheral portions of the runner, and the fluid circuits also communicate with the chambers 138 and 140 through ducts 168 and 170. As previously mentioned, the chambers 138 and 140 are connected with each other by passages, such as 136 and 137, between the keyed areas of the peripheral flange 120 and the outer shell 126.

In order to facilitate lubricating and cooling the rotating components of the fluid coupling, suitable ducts, such as 172, 174 and 176, communicating with the longitudinal passageway 146 in the driven shaft 32 are also provided.

For the purpose of controlling the speed and torque of the fluid coupling and to provide means for rapidly disengaging the unit, a control member, generally designated 178, is provided. The control member 178 functions to remove fluid from the fluid circuits of the fluid coupling and also functions to regulate the amount of fluid contained within the fluid circuits of the coupling. The control member 178 is comprised of a plurality of radially extending vanes 180 which are mounted in angularly spaced relationship on an integral hub 182. The vanes 180 define radial passageways 184 which curve radially outward into the direction of rotation of the impellers, and the radial outer end portions of the passageways 184 define entrance openings 186 for the fluid. The radially inner end portions of the passageways 184 communicate with an axially extending discharge opening 188 through which the fluid is discharged from the control member exteriorly of the outer shell 126. Means are also provided for transmitting a torsional effort to the control member 178. In the embodiment of the invention illustrated, a brake drum 190 is provided having a brake lining 192 fixed to the inner surface thereof. The brake lining is adapted to engage the hub portion 182 of the control member when pressure is applied to the brake drum by any suitable or conventional means.

The control member 178 is mounted concentrically on the hub portion 60 of the impeller 38 so that the vanes 180 are disposed in the chamber 140 while the discharge openings 188 communicate with the exterior of the outer shell member 126. Suitable bearings 194 are provided between the hub 182 of the control member and the hub portion 60 of the impeller 38 so that the control member is free to rotate about the axis of the hub portion 60 of the impeller 38.

When the fluid coupling is operating, the control member 178 will rotate at substantially the same speed that the fluid within the chamber 140 rotates, assuming that no resisting torsional effort is applied to the control member. The control member, rotating in this manner, will not alter the quantity of fluid within the chamber 140 since, in order to change the direction of the fluid velocity, it is necessary to apply a resisting force, assuming that bearing friction and the like are neglected. In order to discharge fluid from chamber 140, a resisting torsional effort is applied to the control member 178 through the agency of the brake drum 190 and lining 192. The torsional effort will resist the tendency of the control member to rotate, thereby creating a relative velocity of the fluid to the control member. The direction of the relative velocity is changed by the contour of the vanes 180 or passages 184 and by the resisting force exerted in the fluid by the vanes 180 or passages 184. The change in the direction of the relative velocity is radially inward and results in a flow of fluid to the discharge opening 188 from which the fluid is expelled from the control member. The product of the force against the vanes, developed by the direction of the relative velocity and the mass rate of flow, and the radius at which the force acts is equivalent to the resisting torsional effort applied to the control member.

Consequently, to increase or decrease the rate of discharge, an increased or decreased resisting torsional effort must be applied. From the above description, it will be apparent that when a resisting torsional effort is applied, the control member will commence to empty the fluid from the chamber 140 and will continue to empty the chamber until the inner diameter of the rotating rim of the fluid within the chamber 40 exceeds the outer diameter of the control chamber. It will also be apparent that complete declutching can be accomplished in a relatively short time and that by adjusting or regulating the resisting torsional effort applied to the control member, the quantity of fluid within the chamber 140 may be regulated to vary the speed and torque of the unit.

In the operation of the fluid coupling, power from a prime mover is transmitted to the fluid coupling through the drive shaft 22, the ring gear 66, and the gear 64 to the impeller 38. At the same time, fluid under pressure is supplied to the fluid coupling through the supply line 148, the longitudinal passageway 146, ports 154, annular groove 156, and ports 158, 160, 162 and 164 to the fluid circuits defined by the chambers 40 and 46 and the chambers 42 and 48. The power applied to the impeller 38 is transmitted to the impeller 36 through the keyed flange portions 124 and 120 of the impeller shell members. Since the outer shell 126 is keyed to the peripheral flanges 120 and 124 in a manner which permits radial movement of the outer shell, the outer shell is subjected to the high fluid pressures only and is not subjected to torsional stresses. At the same time, the flange portions 120 and 124 joining the impellers are relieved of all hydraulic radial forces and are subjected only to torsional forces. Since the outer shell is keyed to the impellers, relative tangential movement between the outer shell and the impellers is prevented, and at the same time, the outer shell is prevented from moving axially relative to the impellers, the butt ends of the keys 134 engaging the ends of the keyways 135 which serve as abutment stops. From the above description it will be apparent that because of the hydraulic balance achieved in the embodiment of the invention illustrated, the torsional stresses are separated from the hydraulic stresses, thereby permitting the transmission of relatively high power at relatively high speeds, which conditions may be encountered, for example in transmitting the power developed by a gas turbine.

Under normal operation, the fluid which circulates through the unit will enter through the openings between the impellers and the runner at the center of the circuit profile and overflow from the openings 200 and 202 in the outer shell 126 at either end of the assembly, the overflow being returned to the fluid source from a sump (not shown) provided in the housing 12. Such a flow arrangement insures a change of fluid with each circuit.

Since the vanes 76 and 96 of the impellers and the runner, respectively, are secured to the impeller shell members and the runner shell member in a manner which permits distortion of the impeller and runner shell members with respect to the neighboring vanes, the impeller shell members and the runner shell member are permitted to expand under the uniformly distributed hydraulic pressure and are, therefore, stressed evenly without reverse moments or stress concentrations.

It will be noted that a bearing support is provided on either side of the rotors, a piloted gear type of flexible coupling being provided on one side of the rotors and the rotors being supported radially by the bearings 134 and 18 on the other side, the spacing between the runner and the impellers being maintained by the thrust bearing 58. The distal end of the driven shaft 32 may be conveniently supported by any desired or conventional bearing means.

While a preferred embodiment of the invention has been shown and described, it will be understood that various changes and modifications may be made without departing from the spirit of the invention.

What is claimed is:

1. In a fluid coupling, the combination including a first impeller, a second impeller disposed in spaced substantially coaxial relationship with respect to said first impeller, a runner interposed between said first and second impellers, said impellers and said runner defining a plurality of fluid circuits, an outer shell member enveloping said impellers and said runner and defining a plurality of fluid passageways between said outer shell member and said impellers, means connecting said fluid passageways with said circuits, means joining said impellers, said means joining said impellers being exposed to the fluid pressure in said fluid passageways and said circuits whereby said means joining said impellers is relieved of substantial hydraulic pressure differentials while subjected to torsional stresses, and means keying the central portion only of said shell member to said impellers and permitting said shell member to move radially outwardly relative to said impellers when said shell member is subjected to hydraulic pressures, the opposite end portions of said shell member being free to move relative to said impellers and said runner.

2. In a fluid coupling, the combination comprising a pair of impellers each including a shell member defining an open-sided chamber, a runner disposed in substantially coaxial tandem relationship with respect to said impellers and including a shell member defining a pair of open-sided chambers spacedly confronting said impeller chambers whereby said chambers define a plurality of fluid circuits, said impellers and runner including a plurality of vane members in each of said chambers, slot and tab fastening means securing some of said vane members to said impeller shell members in radially extending angularly spaced relationship and permitting relative radial movement between said last-mentioned vane members and said impeller shell members, slot and tab fastening means securing the remaining vane members to said runner shell member in radially extending angularly spaced relationship and permitting relative radial movement between said remaining vane members and said runner shell member, an outer shell member enveloping said impellers and said runner and defining a plurality of fluid passageways between said outer shell member and said impellers, means connecting said fluid passageways with said circuits, means joining said impellers, said means joining said impellers being exposed to the fluid pressures in said fluid passageways and said circuits whereby said means joining said impellers is relieved of substantial hydraulic pressure differentials when subjected to torsional stresses, and means keying the central portion only of said shell member to said impellers and permitting said shell member to move radially relative to said impellers when subjected to hydraulic pressures, the opposite end portions of said outer shell member being free to move relative to said impellers and said runner.

*3. In combination with a driving structure including a driving member and an impeller drivable thereby, a driven structure including a runner and a driven member drivable by the runner, said impeller and runner having confronting coacting fluid circuit chamber portions and defining a fluid coupling, a rotary casing including a shell enveloping said impeller and runner and rotatably drivably keyed to one only of said structures, all portions of said shell being radially expansible independently of both of said structures.*

References Cited in the file of this patent or the original patent

UNITED STATES PATENTS 1,858,514 Lell ---------- May 17, 1932
1,859,607 Sinclair ---------- May 24, 1932

(Other references on following page)

UNITED STATES PATENTS

| | | |
|---|---|---|
| 2,240,270 | Schaefer | Apr. 29, 1941 |
| 2,429,503 | Zeidler | Oct. 21, 1947 |
| 2,439,630 | Nutt | Apr. 13, 1948 |
| 2,491,483 | Dolza et al. | Dec. 20, 1949 |
| 2,544,542 | Palen et al. | Mar. 6, 1951 |
| 2,623,407 | Mayner | Dec. 30, 1952 |
| 2,624,175 | Raney | Jan. 6, 1953 |
| 2,651,919 | Venstrom | Sept. 15, 1953 |
| 2,687,195 | Gleasman | Aug. 24, 1954 |
| 2,691,269 | Chamberlain | Oct. 12, 1954 |
| 2,745,354 | English et al. | May 15, 1956 |

FOREIGN PATENTS

| | | |
|---|---|---|
| 1,043,365 | France | June 10, 1953 |